US012242211B2

(12) United States Patent
Suzuki

(10) Patent No.: US 12,242,211 B2
(45) Date of Patent: Mar. 4, 2025

(54) METHOD OF CONTINUING USE OF A CONTRACT CARTRIDGE AT AN IMAGE FORMING APPARATUS

(71) Applicant: BROTHER KOGYO KABUSHIKI KAISHA, Nagoya (JP)

(72) Inventor: Takashi Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/165,018

(22) Filed: Feb. 6, 2023

(65) Prior Publication Data

US 2024/0027935 A1 Jan. 25, 2024

Related U.S. Application Data

(63) Continuation of application No. 17/861,875, filed on Jul. 11, 2022, now Pat. No. 11,573,505, which is a (Continued)

(30) Foreign Application Priority Data

Mar. 31, 2020 (JP) ................................ 2020-064039

(51) Int. Cl.

*G03G 15/00* (2006.01)
*B41J 2/175* (2006.01)

(Continued)

(52) U.S. Cl.

CPC ...... *G03G 15/0863* (2013.01); *B41J 2/17546* (2013.01); *G03G 15/5016* (2013.01);

(Continued)

(58) Field of Classification Search

CPC ........... G03G 15/0863; G03G 15/5016; G03G 15/5091; G03G 15/5079; G03G 15/5083;

(Continued)

(56) References Cited

U.S. PATENT DOCUMENTS

2002/0076224 A1 6/2002 Pollocks, Jr.
2002/0134829 A1 9/2002 Tanaka (Continued)

FOREIGN PATENT DOCUMENTS

EP 3785919 A1 3/2021
JP 2008-137333 A 6/2008

(Continued)

OTHER PUBLICATIONS

International Search Report and Written Opinion issued in corresponding International Patent Application No. PCT/JP2021/012738, Jun. 15, 2021.

(Continued)

*Primary Examiner* — Robert B Beatty
(74) *Attorney, Agent, or Firm* — Merchant & Gould P.C.

(57) ABSTRACT

An image indicating an option to purchase a contract cartridge according to a cancellation of a service contract may be displayed at a computer. The contract cartridge is useable in a contract state, and configured to be unusable in a normal (non-contract) state. In response to selection of the option, an instruction may be transmitted to modify a setting of the contract cartridge to allow use of the contract cartridge when the image forming apparatus is in the normal state.

8 Claims, 7 Drawing Sheets

Related U.S. Application Data continuation of application No. 17/213,422, filed on Mar. 26, 2021, now Pat. No. 11,397,389.

(51) Int. Cl.

| | |
|---|---|
| ***G03G 15/08*** | (2006.01) |
| ***G03G 21/00*** | (2006.01) |
| ***G03G 21/18*** | (2006.01) |

(52) U.S. Cl.

CPC . *G03G 21/1878* (2013.01); *G03G 2215/0695* (2013.01); *G03G 2215/0697* (2013.01); *G03G 2221/1823* (2013.01)

(58) Field of Classification Search

CPC ........... G03G 21/1875; G03G 21/1878; G03G 21/1892; G03G 2215/0695; G03G 2221/1823; B41J 2/17543; B41J 2/17546; G06F 3/1219; G06F 3/1229; G06F 3/1231; G06F 3/1239; G06F 3/1296; G06K 15/407; G06Q 10/087; G06Q 10/06312

USPC ............................... 399/8, 11, 12, 24, 79, 81

See application file for complete search history.

(56) References Cited

U.S. PATENT DOCUMENTS

| | | | | |
|---|---|---|---|---|
| 2003/0208607 | A1 | 11/2003 | Yamazaki | |
| 2012/0044539 | A1 | 2/2012 | Yamaguchi | |
| 2012/0051758 | A1 | 3/2012 | Hayakawa et al. | |
| 2017/0063646 | A1 | 3/2017 | Kawai | |
| 2017/0161719 | A1 | 6/2017 | Bhatia | |
| 2018/0131831 | A1 | 5/2018 | Tolia et al. | |
| 2018/0241833 | A1* | 8/2018 | Hachiya | H04L 67/146 |
| 2020/0096900 | A1* | 3/2020 | Moriya | G03G 15/0863 |
| 2021/0035194 | A1* | 2/2021 | Nakaishi | G07F 17/266 |
| 2021/0072692 | A1 | 3/2021 | Suzuki | |
| 2021/0096793 | A1 | 4/2021 | Fukusada | |

FOREIGN PATENT DOCUMENTS

| | | | |
|---|---|---|---|
| JP | 2010-50564 | A | 3/2010 |
| JP | 2019-31023 | A | 2/2019 |
| WO | 2016171694 | A1 | 10/2016 |
| WO | 2020117417 | A1 | 6/2020 |

OTHER PUBLICATIONS

Extended European Search Report in corresponding European application No. 21779870.1, Apr. 8, 2024.

* cited by examiner

FIG. 6

MAIN MEMORY

F1

| | VALUES WHEN SERVICE CONTRACT IS IN FORCE |
|---|---|
| CONTROL MODE | CONTRACT |
| PRINTER ID | PRN001234 |
| FIRST HISTORY OF TONER ID | TN1230001 |
| SECOND HISTORY OF TONER ID | TN1234357 |
| THIRD HISTORY OF TONER ID | TN1229808 |
| FOURTH HISTORY OF TONER ID | TN1215431 |
| USAGE MODE | FIRST MODE |
| NUMBER OF UNUSED TONER CARTRIDGES | NO LIMIT |

F2

CONTINUOUS USE OF POSSESSED CARTRIDGE IS SELECTED

| | VALUES WHEN CONTRACT IS CANCELLED | AFTER ONE UNUSED CARTRIDGE IS USED FURTHER |
|---|---|---|
| CONTROL MODE | NORMAL | NORMAL |
| PRINTER ID | PRN001234 | PRN001234 |
| FIRST HISTORY OF TONER ID | TN1230001 | TN1277335 |
| SECOND HISTORY OF TONER ID | TN1234357 | TN1230001 |
| THIRD HISTORY OF TONER ID | TN1229808 | TN1234357 |
| FOURTH HISTORY OF TONER ID | TN1215431 | TN1229808 |
| USAGE MODE | FIRST MODE | SECOND MODE |
| NUMBER OF UNUSED TONER CARTRIDGES | 1 | 0 |

F3

IMMEDIATE STOPPING USE IS SELECTED

| | VALUES WHEN CONTRACT IS CANCELLED |
|---|---|
| CONTROL MODE | NORMAL |
| PRINTER ID | PRN001234 |
| FIRST HISTORY OF TONER ID | TN1230001 |
| SECOND HISTORY OF TONER ID | TN1234357 |
| THIRD HISTORY OF TONER ID | TN1229808 |
| FOURTH HISTORY OF TONER ID | TN1215431 |
| USAGE MODE | NON USE |
| NUMBER OF UNUSED TONER CARTRIDGES | 0 |

FIG. 7

TONER MEMORY

F4

| | WHEN DELIVERY OF CONTRACT CARTRIDGE |
|---|---|
| TYPE | CONTRACT CARTRIDGE |
| TONER ID | TN1230001 |
| PRINTER ID | UNUSED |
| CONTINUOUSLY USABLE FLAG | FALSE |

CONTINUOUS USE OF POSSESSED CARTRIDGE IS SELECTED

F5

| | AFTER CONTRACT IS CANCELLED |
|---|---|
| TYPE | CONTRACT CARTRIDGE |
| TONER ID | TN1230001 |
| PRINTER ID | PRN001234 |
| CONTINUOUSLY USABLE FLAG | TRUE |

IMMEDIATE STOPPING USE IS SELECTED

F6

| | WHEN TONER IS DELIVERED |
|---|---|
| TYPE | CONTRACT CARTRIDGE |
| TONER ID | TN1230001 |
| PRINTER ID | PRN001234 |
| CONTINUOUSLY USABLE FLAG | FALSE |

TONER MEMORY

F7

| | WHEN DELIVERY OF CONTRACT CARTRIDGE |
|---|---|
| TYPE | CONTRACT CARTRIDGE |
| TONER ID | TN1230001 |

CONTINUOUS USE OF POSSESSED CARTRIDGE IS SELECTED

F8

| | AFTER CONTRACT IS CANCELLED |
|---|---|
| TYPE | NORMAL CARTRIDGE |
| TONER ID | TN1230001 |

METHOD OF CONTINUING USE OF A CONTRACT CARTRIDGE AT AN IMAGE FORMING APPARATUS

CROSS REFERENCE TO RELATED APPLICATION

This application is a continuation of U.S. patent application Ser. No. 17/861,875, filed Jul. 11, 2022, now U.S. Pat. No. 11,573,505, which is a continuation of U.S. patent application Ser. No. 17/213,422 filed Mar. 26, 2021, now U.S. Pat. No. 11,397,389, which claims priority from Japanese Patent Application No. 2020-064039 dated Mar. 31, 2020. The entire contents of the above-mentioned applications are incorporated herein by reference.

TECHNICAL FIELD

The present disclosure relates to an image forming apparatus, a controlling method, and a cartridge.

BACKGROUND

In a conventional technique, in a case where a user subscribes to a subscription plan for a printer, an ink cartridge or a toner cartridge to be attached to the printer is periodically delivered to the user. In this case, a cartridge for the subscription can only be used in a printer for which the user subscribes to the subscription plan. By contrast, a cartridge for trade use can be used both in a printer for which the user subscribes to the subscription plan and a printer for which the user does not subscribe to the subscription plan.

SUMMARY

According to the conventional technique, in response to the user subscribing to the subscription plan, a cartridge attached to the printer is set to a cartridge for the subscription. However, there is no conventional technique that discloses a technique for a case where the printer receives a cancellation instruction to cancel the subscription plan. In view of the foregoing, it is an object of the present disclosure to provide a technique of changing a cartridge for the subscription into a cartridge for trade use in response to the user's cancelation of a service contract (e.g., subscription plan).

In order to attain the above and other objects, the disclosure provides an image forming apparatus. The image forming apparatus includes a main casing, a cartridge, and a controller. The main casing includes a main memory. The cartridge is attachable to the main casing, the cartridge includes a cartridge memory configured to store identification information indicating one of that the cartridge is a contract cartridge or that the cartridge is a normal cartridge. The contract cartridge is usable in a contract state in which a service contract for the image forming apparatus is valid and not usable in a normal state in which the service contract for the image forming apparatus is invalid. The normal cartridge is usable in both a state that the image forming apparatus is in the contract state and a state that the image forming apparatus is in the normal state. The controller is configured to perform: a rewriting process to rewrite the identification information to information indicating that the cartridge is the normal cartridge, in a case where the controller receives a cancellation instruction to instruct to cancel the service contract and the identification information, which is stored in the cartridge memory of the cartridge attached to the main casing, indicates that the cartridge is the contract cartridge.

According to another aspect, the disclosure provides a controlling method for controlling an image forming apparatus. The controlling method includes: a receiving, by the image forming apparatus, a cancellation instruction to instruct to cancel a service contract; and a rewriting identification information to information indicating that a cartridge is a normal cartridge, in a case where the identification information, which is stored in the cartridge memory of a cartridge attached to the image forming apparatus, indicates that the cartridge is a contract cartridge, the contract cartridge being usable in a contract state in which a service contract for the image forming apparatus is valid and not usable in a normal state in which the service contract for the image forming apparatus is invalid, the normal cartridge being usable in both a state that the image forming apparatus is in the contract state and a state that the image forming apparatus is in the normal state.

According to another aspect, the disclosure provides a cartridge. The cartridge includes a cartridge memory, and a cartridge casing. The cartridge memory is configured to store identification information indicating one of that the cartridge is a contract cartridge and that the cartridge is a normal cartridge. The contract cartridge is usable in a contract state in which a service contract for the image forming apparatus is valid and not usable in a normal state in which the service contract for the image forming apparatus is invalid. The normal cartridge is usable in both a state that the image forming apparatus is in the contract state and a state that the image forming apparatus is in the normal state. The cartridge casing includes the cartridge memory. In response to a cancellation instruction to instruct to cancel the service contract, the identification information, which is stored in the cartridge memory of the cartridge attached to the image forming apparatus, indicates that the cartridge is the contract cartridge, the identification information is rewritable to information indicating that the cartridge is the normal cartridge.

BRIEF DESCRIPTION OF THE DRAWINGS

The particular features and advantages of the disclosure as well as other objects will become apparent from the following description taken in connection with the accompanying drawings, in which:

FIG. 6 is a diagram illustrating main memory information stored in a main memory shown in FIG. 2; and FIG. 7 is a diagram illustrating toner memory information stored in a toner memory shown in FIGS. 1 and 2.

DETAILED DESCRIPTION

Configurations of Image Forming Apparatus 1

Figure 1:
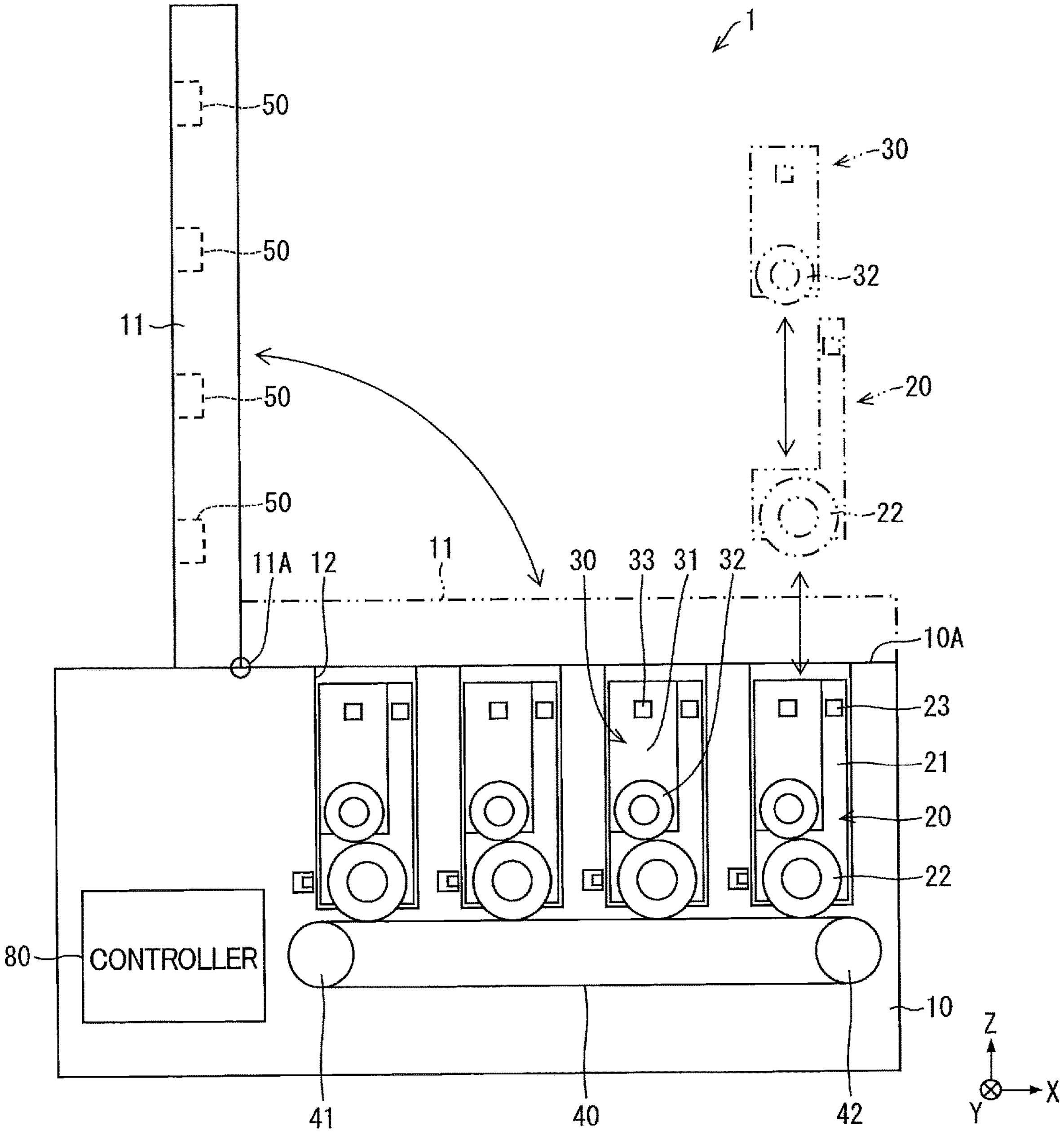
FIG. 1 is a schematic diagram illustrating configurations of an image forming apparatus.
Figure 2:
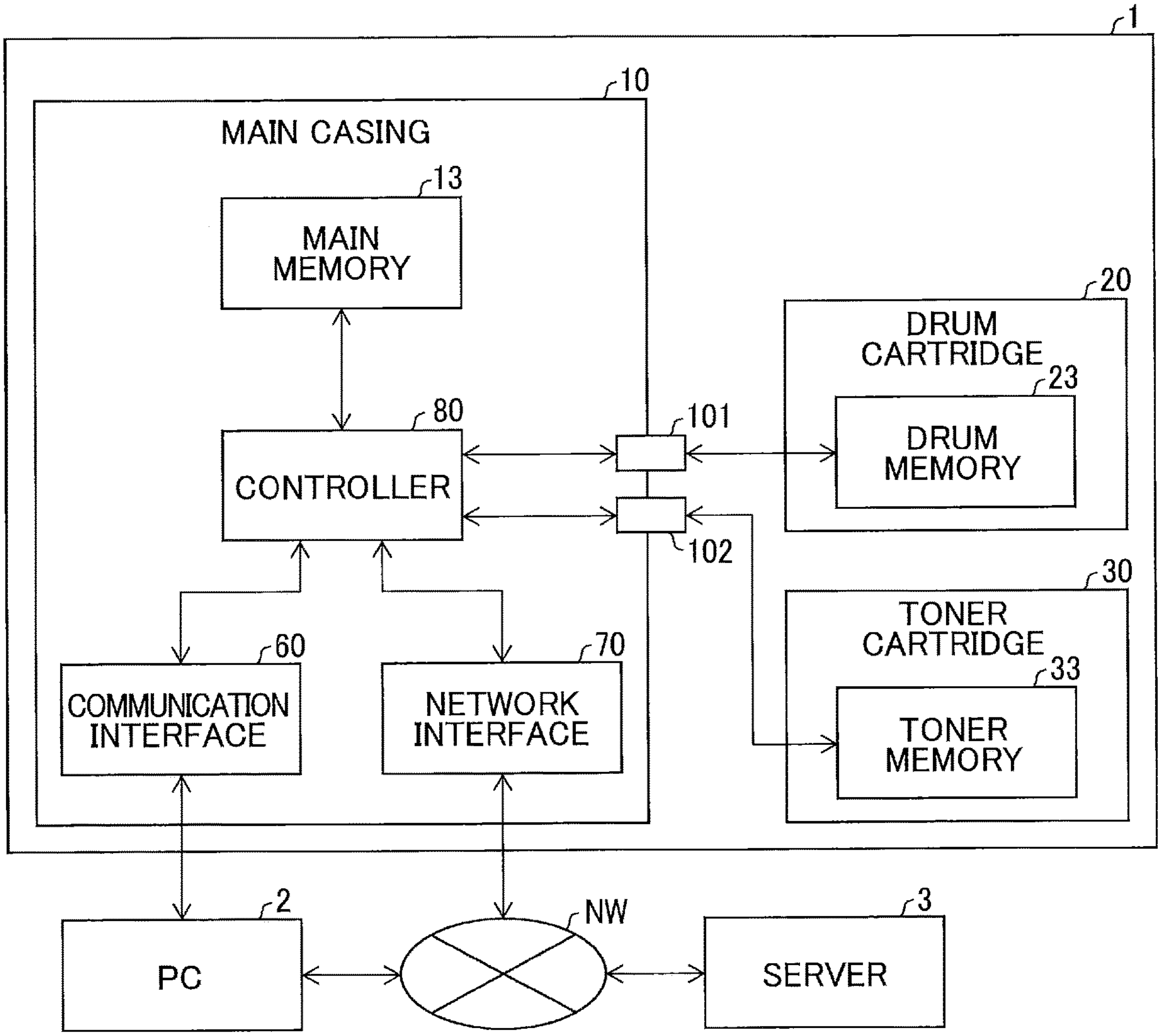
FIG. 2 is a diagram illustrating attachment of a drum cartridge and a toner cartridge to a main casing of the image forming apparatus shown in FIG. 1.

FIG. 1 is a schematic diagram of an image forming apparatus 1 according to a first embodiment of the present disclosure. FIG. 2 is a diagram illustrating attachment of a drum cartridge 20 and a toner cartridge 30 to a main casing 10 of the image forming apparatus 1 shown in FIG. 1. In FIG. 1, a direction in which the drum cartridges 20 are arranged is an X direction, a direction from a transfer belt 40 to a cover 11 in a state that the cover 11 is closed is a Z direction, and a direction orthogonal to both the X and Y directions is a Y direction.

The image forming apparatus 1 is an electrophotographic printer. For example, the image forming apparatus 1 may be an LED (Light Emitting Diode) printer. As illustrated in FIGS. 1 and 2, the image forming apparatus 1 includes the main casing 10, the cover 11, the drum cartridges 20, toner cartridges 30, the transfer belt 40, light source units 50, a communication interface 60, a network interface 70, and a controller 80.

Configurations of Main Casing 10

The main casing 10 has a substantially rectangular box shape. The four drum cartridges 20, the four toner cartridges 30, the transfer belt 70, and the controller 80 are accommodated in the main casing 10. The main casing 10 includes four cartridge holders 12. Each cartridge holder 12 has a recessed shape. By the drum cartridges 20 and the toner cartridges 30 being held by the respective cartridge holders 12, the drum cartridges 20 and the toner cartridges 30 are attached to the main casing 10.

A display portion such as a liquid-crystal display and a lump, and an input portion such as buttons may be provided at an outer surface of the main casing 10. The liquid-crystal display may include a touch panel to function as the input portion.

Configurations of Cover 11

The cover 11 opens and closes an opening 10A formed in an upper end of the main casing 10. As illustrated in FIG. 1, the cover 11 is pivotally movable about a pivot axis 11A between an open position indicated by a solid line where the opening 10A is opened and a close position indicated by a two-dot chain line where the opening 10A is closed. The pivot axis 11A extends in the Y direction.

In a case where the cover 11 is at the open position, the opening of each cartridge holder 12 is opened. In a case where the cover 11 is at the close position, the opening of each cartridge holder 12 is covered by the cover 11. An opening sensor (not shown) is provided in the main casing 10 for the opening 10A. The closing sensor can detect that the cover 11 is at the close position. The closing sensor may be a contact-type sensor or an optical-type sensor, for example.

The drum cartridges 20 are examples of cartridges, and attachable to the main casing 10. Each drum cartridge 20 includes a cartridge casing 21, a photosensitive drum 22 and a drum memory 23. Each cartridge casing 21 is provided with the photosensitive drum 22 and the drum memory 23.

Each photosensitive drum is a component used for image formation, and a replaceable component need to be replaced when surfaces of the photosensitive drums 21 deteriorate due to wear with use. Each photosensitive drum 22 is a cylindrical photosensitive body extending in the Y direction and rotatable about a drum axis extending in the Y direction. An outer circumferential surface of each photosensitive drum 22 is coated with a photosensitive material.

The drum memory 23 is an example of a cartridge memory, and capable of reading and writing information. Each drum memory 23 is a flash ROM (Read Only Memory) or an EEPROM (Registered Trademark, Electronically Erasable and Programmable Read Only Memory). Each drum memory 23 stores a drum ID, drum life information, and drum identification information.

The drum ID is a unique serial number for identifying the individual drum cartridge 20. The drum life information includes at least one of the cumulative number of rotations of the photosensitive drum 22 and the cumulative number of sheets printed using the photosensitive drum 22, for example. The drum cartridge 20 identified by the drum ID calculates the cumulative number of rotations of the photosensitive drum 22 and the cumulative number of sheets printed using the photosensitive drum 22 by incrementing or decrementing the cumulative number of rotations of the photosensitive drum 22 and the cumulative number of sheets printed using the photosensitive drum 22 each time printing is performed.

The drum identification information is an example of identification information. The drum identification information indicates one of that the drum cartridge 20 is a contract cartridge and that the drum cartridge 20 is a normal cartridge. The contract cartridge is usable in a contract state that a service contract is valid for the image forming apparatus 1 and is not usable in a normal state that the service contract is invalid for the image forming apparatus 1. The normal cartridge is usable both in the contract state and in the normal state.

Under the service contract, a drum cartridge(s) 20 and a toner cartridge(s) 30 may be automatically delivered to the user according to each life information stored in a main memory 13 included in the main casing 10, and the user can use these contract cartridges.

The contract state will be described below, taking one toner cartridge 30 as an example. In a case where the service contract is valid for the image forming apparatus 1, the user is allowed to print a predetermined number of sheets using the toner cartridge 30 at a fixed price for each set period of time (e.g., one month). In this case, the image forming apparatus 1 uses a dedicated counter to count the number of sheets printed using the contract toner cartridge 30 in a state the contract toner cartridge 30 is attached to the image forming apparatus 1. In a case where the service contract is valid for the image forming apparatus 1, the image forming apparatus 1 is in either an (A) state or a (B) state. In the (A) state, the image forming apparatus 1 can use the contract toner cartridge 30 but the contract toner cartridge 30 is not attached to the image forming apparatus 1. In the (B) state, the image forming apparatus 1 can use the contract toner cartridge 30 and the contract toner cartridge 30 is attached to the image forming apparatus 1. In the (A) state, since the contract toner cartridge 30 is not attached to the image forming apparatus 1, the image forming apparatus 1 does not count the number of sheets printed using the dedicated counter. In the (B) state, since the contract toner cartridge 30 is attached to the image forming apparatus 1, the image forming apparatus 1 counts the number of sheets printed using the dedicated counter.

In the present disclosure, canceling the service contract means that the use of the contract toner cartridge 30 is disabled in the image forming apparatus 1 and the service contract valid for the image forming apparatus 1 is canceled, regardless of whether the image forming apparatus 1 is in the (A) state or the (B) state.

In addition to the drum ID, the drum life information, and the drum identification information, the drum memory 23 may also store a conforming model of the drum cartridge 20, specifications of the drum cartridge 20, information indicating one of that the drum cartridge 20 is unused and that the drum cartridge 20 is not unused, and an error history of the drum cartridge 20. A toner memory 33 may also store information corresponding to these pieces of information.

Configuration of Toner Cartridges 30

The toner cartridges 30 are examples of cartridges and are attachable to the main casing 10. The toner cartridges 30 are attachable to the drum cartridges 20. In a state that the toner cartridges 30 are attached to the respective drum cartridges 20, the toner cartridges 30 and the drum cartridges 20 are together attached to the main casing 10. Each toner cartridge 30 includes a cartridge casing 31, a developing roller 32, and a toner memory 33. Each cartridge casing 31 includes one developing roller 32 and one toner memory 33. Each cartridge casing 31 accommodates toner.

The cartridge casings 31 accommodate toner of four different colors, e.g., cyan, magenta, yellow, and black, as the materials used for image formation. Each cartridge casing 31 accommodates toner of one color. The toner is a consumable that runs out with use.

Each developing roller 32 is a cylindrical member extending in the Y direction and rotatable about a developing axis extending in the Y direction. In a case where the toner cartridges 30 is attached to the respective drum cartridges 20, outer circumferential surfaces of the developing rollers 32 contact the outer circumferential surfaces of the respective photosensitive drums 22.

Each toner memory 33 is a readable and writable memory and an example of the cartridge memory. Each toner memory 33 is a flash ROM or an EEPROM, for example. Each toner memory 33 stores a toner ID, toner life information, and toner identification information as information related to the corresponding toner cartridge 30, for example.

The toner ID is a unique serial number for identifying the toner cartridge 30. The toner life information includes at least one of the cumulative number of rotations of the developing roller 32, the cumulative number of sheets printed using the developing roller 32, and the cumulative number of dots formed using the developing roller 32, for example.

The toner cartridge 30 identified by the toner ID calculates the cumulative number of rotations of the developing roller 32 by incrementing or decrementing the cumulative number of rotations of the developing roller 32 each time printing is performed. Similarly, the toner cartridge 30 identified by the toner ID calculates the cumulative number of sheets printed using the developing roller 32 and the cumulative number of dots formed using the developing roller 32 by incrementing or decrementing the cumulative number of sheets printed using the developing roller 32 and the cumulative number of dots using the developing roller 32 each time printing is performed.

The toner identification information is an example of the identification information. The toner identification information indicates one of that the toner cartridge 30 is a contract cartridge and that the toner cartridge 30 is a normal cartridge. The contract cartridge and the normal cartridge for the toner cartridge 30 have similar meanings to those of the contract cartridge and the normal cartridge for the drum cartridge 20.

As illustrated in FIG. 1, in a state that the cover 11 is positioned at the open position, the drum cartridges 20 and the toner cartridges 30 are attachable to the main casing 10. In this state, the drum cartridges 20 and the toner cartridges 30 are inserted into the respective cartridge holders 12 through the opening 10A.

As illustrated in FIG. 2, the main casing 10 includes connectors 101 and 102. In a state that the drum cartridge 20 is inserted into the corresponding cartridge holder 12, the connector 101 is electrically connected to the corresponding drum memory 23, and the controller 80 of the main casing 10 can communicate with the drum memory 23 of the drum cartridge 20.

In a state that the toner cartridge 30 is attached to the main casing 10, the connector 102 is electrically connected to the corresponding toner memory 33, and the controller 80 of the main casing 10 can communicate with the toner memory 33 of the toner cartridge 30.

Configuration of Transfer Belt 40

The transfer belt 40 is a component to transfer toner on the outer circumferential surfaces of the photosensitive drums 22 to a printing sheet. The transfer belt 40 is a replaceable component to be replaced since surface of the transfer belt 40 deteriorates due to wear with use. The transfer belt 40 has a ring shape capable of contacting the photosensitive drum 22. An outer circumferential surface of the transfer belt 40 can contact the outer circumferential surfaces of the photosensitive drums 22. When printing, a printing sheet is transferred between the transfer belt 40 and the photosensitive drums 22.

The transfer belt 40 is stretched between a drive roller 41 and a driven roller 42. The drive roller 41 drives the transfer belt 40. The controller 80 rotates the drive roller 41. The driven roller 42 rotates by following moving of the transfer roller 40 caused by driving of the drive roller 41

Configuration of Light Source Units 50

The four light source units 50 are attached to an inner surface of the cover 11 and correspond to the respective drum cartridges 20. In a case where the drum cartridges 20 are attached to the main casing 10 and the cover 11 is positioned at the close position, the light source units 50 face the surfaces of the respective photosensitive drums 22. Each light source unit 50 includes a plurality of light sources. The light sources are arranged in the Y direction and can irradiate the outer circumferential surface of the corresponding photosensitive drum 22 with light. The light sources are LEDs, for example.

The light source units 50 are electrically connected to the controller 80. The controller 80 controls the light sources to irradiate the outer circumferential surfaces of the respective photosensitive drums 22 with light based on image data received. Accordingly, the photosensitive materials on the outer circumferential surfaces of the photosensitive drums 22 are exposed to light based on the image data.

Configuration of Communication Interface 60

A USB cable is connected to the communication interface 60. In a case where the USB cable is connected to the communication interface 60, the controller 80 can receive a print job from a PC (Personal Computer) 2 via the communication interface 60 and the USB cable. The print job is a print instruction transmitted from an external device such as the PC 2 to the controller 80. The controller 80 may also communicate with the PC 2 via the communication interface 60 using wireless communication.

Configuration of Network Interface 70

The network interface 70 is connected to a server 3 via a network NW. A LAN (Local Area Network) cable is connected to the network interface 70. In a case where the LAN cable is connected to the network interface 70, the controller 80 can communicate with the server 3 via the network interface 70, the LAN cable, and the network NW. The network interface 70 may be connected to the network NW using wireless communication.

A LAN cable is connected to the PC 2. In a case where the LAN cable is connected to the PC 2, the PC 2 can communicate with the server 3 via the LAN cable and the network NW. The PC 2 may also communicate with the server 3 via the network NW using wireless communication. Processes performed by the PC 2 described in the present embodiment may be performed by a mobile information terminal such as a smartphone.

Configuration of Controller 80

The controller 80 includes an ASIC (Application Specific Integrated Circuit), for example. The controller 80 is electrically connected to the main memory 13 of the main casing 10. The controller 80 performs various processes, causing the image forming apparatus 1 to perform a printing process and other processes associated with the printing process.

The controller 80 may include a processor such as a CPU. In this case, a control program for executing a method of controlling the image forming apparatus 1 may be stored in the main memory 13. By the processor operating according to the control program, the controller 80 may cause the image forming apparatus 1 to perform processes.

The controller 80 may also include a computer-readable storage medium storing the control program. As the storage medium, the controller 80 may include a non-transitory tangible medium such as a ROM (Read Only Memory), a tape, a disk, a card, a semiconductor memory, or a programmable logic circuit.

The controller 80 may also include a RAM (Random Access Memory) to expand the control program therein. The control program may be supplied to a computer included in the controller 80 via any transmission medium (e.g., a communication network or a broadcast wave) capable of transmitting the control program. An aspect of the present disclosure may be implemented in the form of a data signal embedded in a carrier wave, which embodies the control program by electrical transmission.

As illustrated in FIG. 2, in a case where the drum cartridge 20 and the toner cartridge 30 are attached to the corresponding cartridge holder 12, the drum memory 23 and the toner memory 33 are electrically connected to the controller 80. Accordingly, the controller 80 can perform a reading process to read information from the drum memory 23 and the toner memory 33 and a writing process to write information to the drum memory 23 and the toner memory 33.

The main casing 10 includes the main memory 13. The main memory 13 is a readable and writable memory. The main memory 13 is a flash ROM or an EEPROM, for example. The main memory 13 stores registration information and life information. The registration information includes the drum ID read from each drum memory 23 and the toner ID read from each toner memory 33.

The life information includes drum life information and toner life information. The drum life information stored in the main memory 13 is identical to the drum life information stored in each drum memory 23. The toner life information stored in the main memory 13 is identical to the toner life information stored in each toner memory 33. The main memory 13 may also include a printer ID. The printer ID is identification information for identifying the image forming apparatus 1 and is a serial number, for example.

Figure 3:
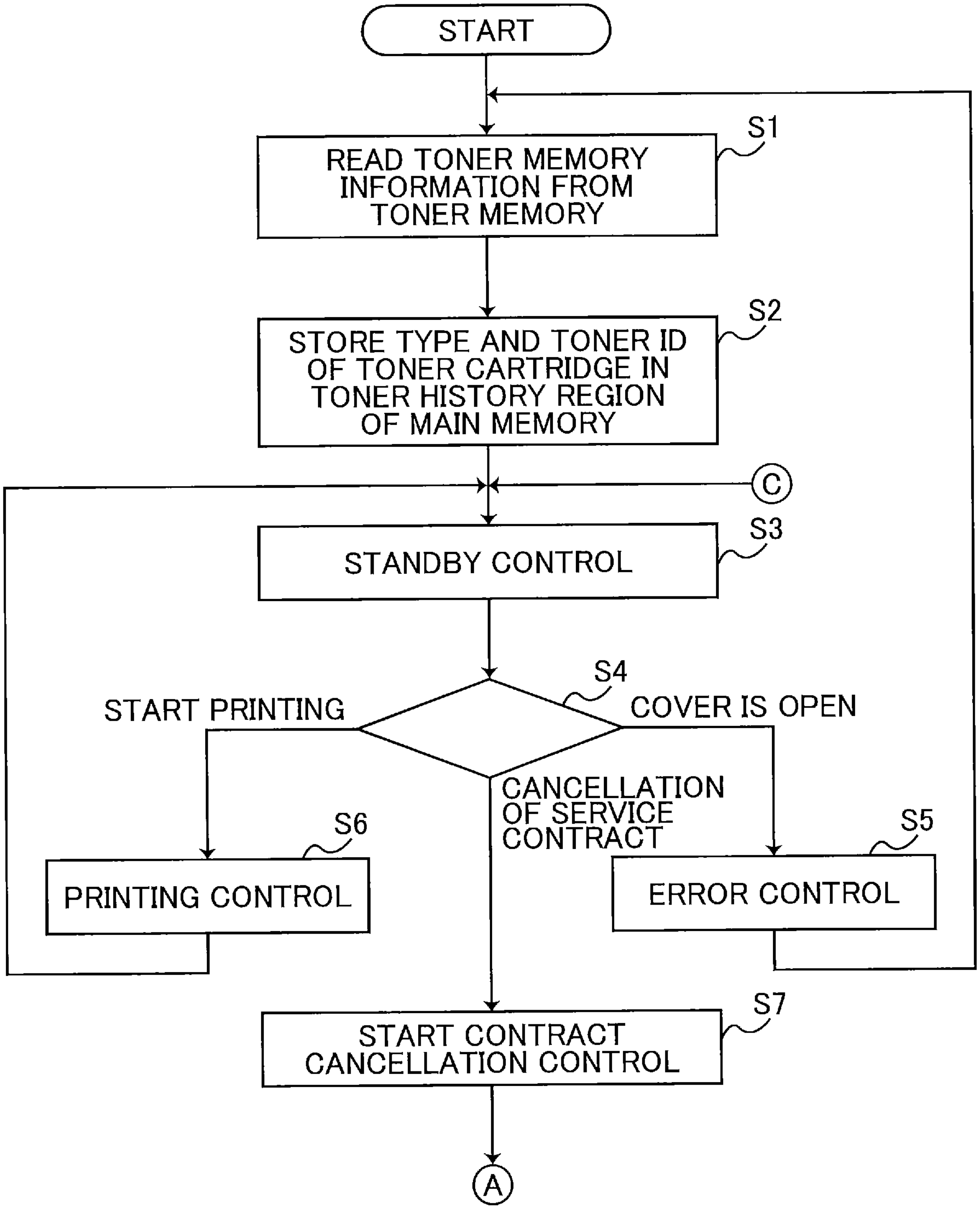
FIG. 3 is a flowchart illustrating procedures of a process performed by the image forming apparatus shown in FIGS. 1 and 2.
Figure 4:
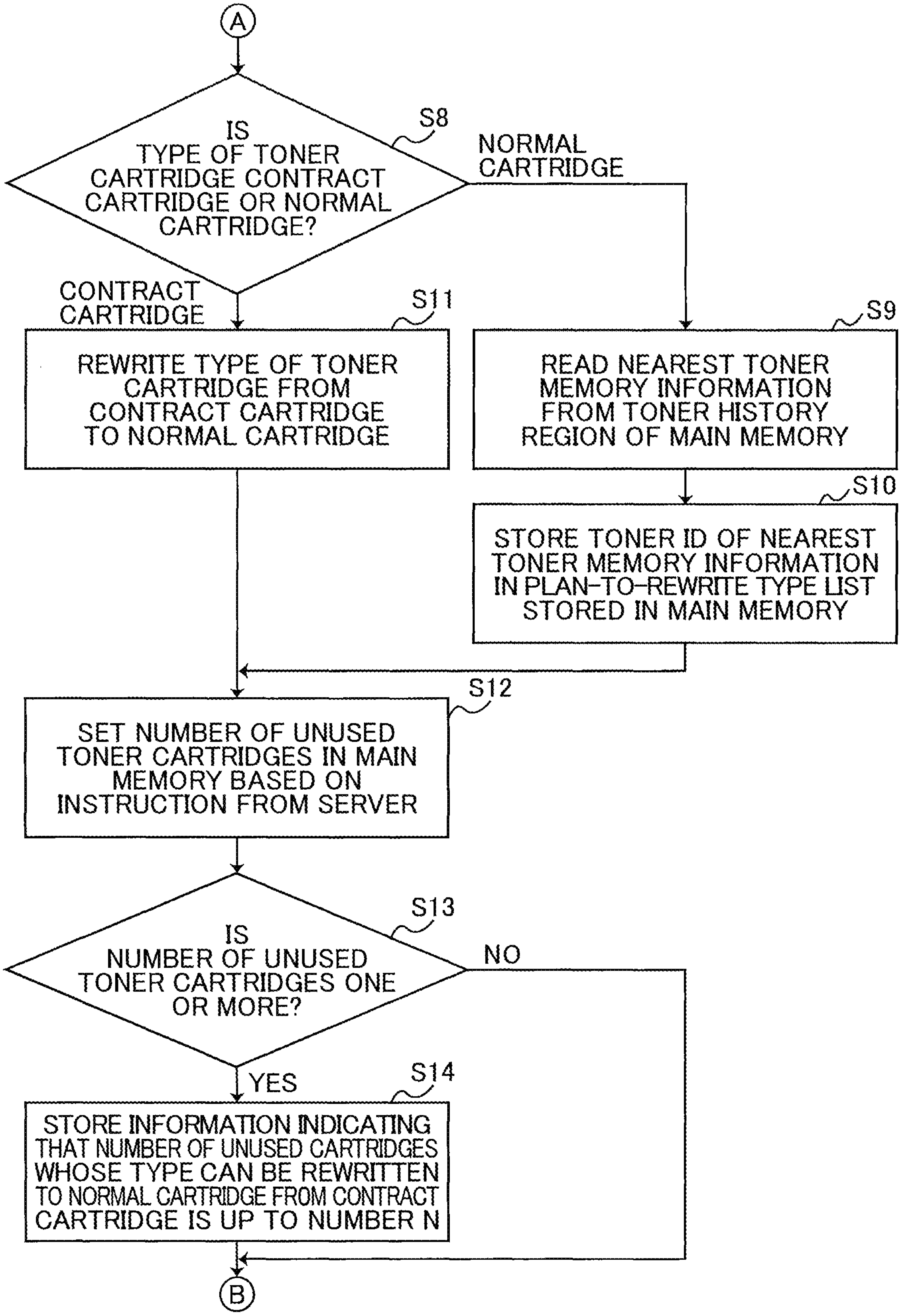
FIG. 4 is a flowchart illustrating procedures of a process following those of FIG. 3 performed by the image forming apparatus.
Figure 5:
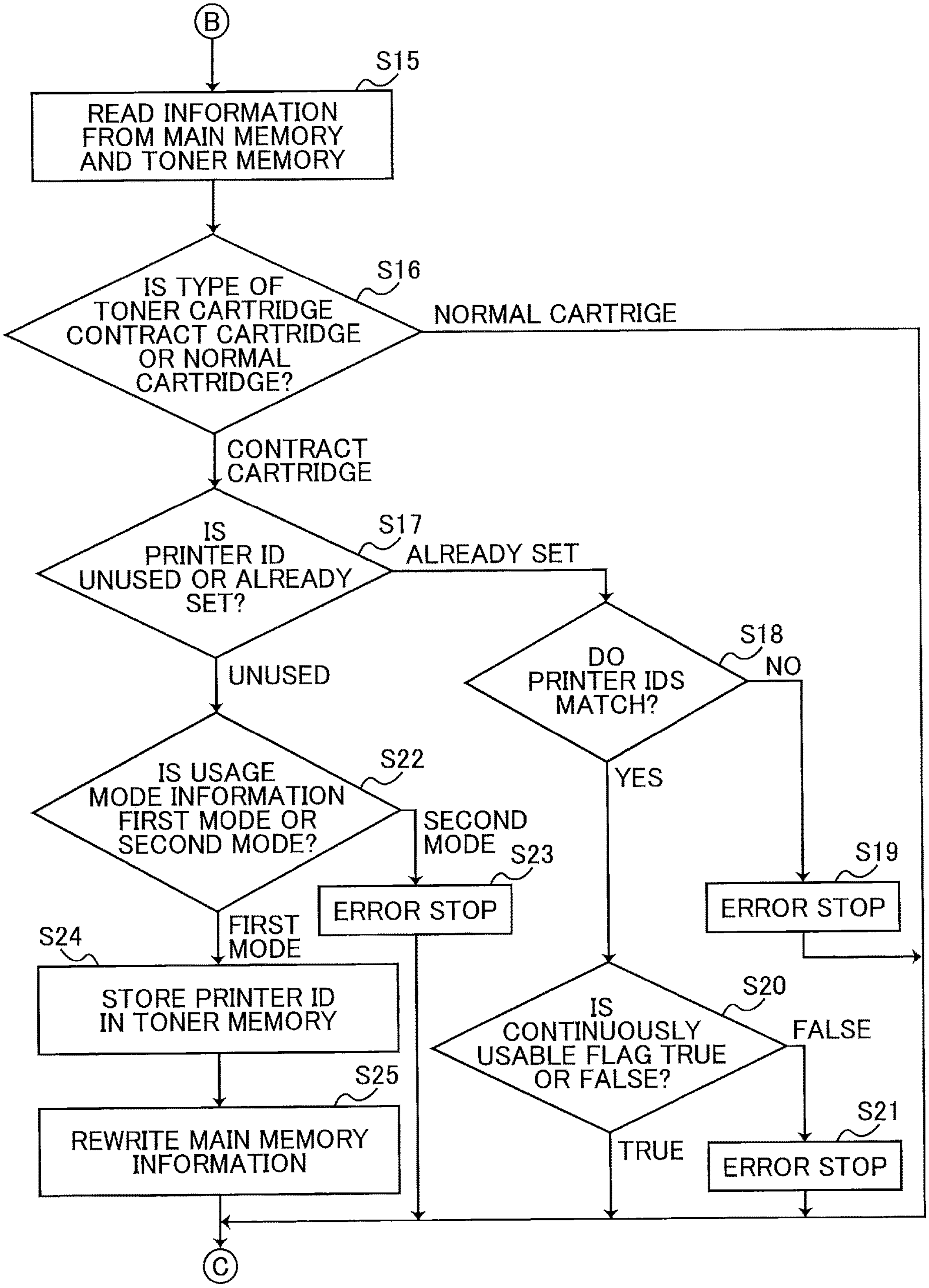
FIG. 5 is a flowchart illustrating procedures of a process following those of FIG. 4 performed by the image forming apparatus.

FIG. 3 is a flowchart illustrating steps of a process performed by the image forming apparatus 1 illustrated in FIGS. 1 and 2. FIG. 4 is a flowchart illustrating a process following the process illustrated in FIG. 3. FIG. 5 is a flowchart illustrating a process following the process illustrated in FIG. 4. FIG. 6 illustrates main memory information stored in the main memory 13 illustrated in FIG. 2. FIG. 7 illustrates toner memory information stored in the toner memory 33 illustrated in FIGS. 1 and 2.

By referring to FIGS. 3 to 5, the steps of the process including processes related to the toner memory information stored in each toner memory 33 will be described. The steps of the process described herein is an example of the control method performed by the controller 80 controlling the image forming apparatus 1. Since the processes related to the information stored in each drum memory 23 are similar to the processes related to the toner memory information stored in each toner memory 33, the description thereof is omitted.

With reference to FIGS. 3 to 5, the steps of the process including the processes related to the toner memory information stored in the toner memory 33 of one of the four toner cartridges 30 will be described. Since the processes related to the toner memory information of each of the other toner cartridges 30 are similar to the processes related to the toner memory information of the toner cartridge 30 described below, the description thereof is omitted.

The controller 80 starts a process of the following step S1 in response to the image forming apparatus 1 turned on or in response to the cover 11 moved from the open position to the close position in a state that the image forming apparatus 1 is turned on.

As illustrated in FIG. 3, in S1, in a case where the toner cartridge 30 is attached to the main casing 10, the controller 80 reads the toner memory information from the toner memory 33. As illustrated in F4 of FIG. 7, the type of the toner cartridge 30, the toner ID, the printer ID, and a continuously usable flag are stored in the toner memory 33 as the toner memory information. The state of the toner memory 33 illustrated in F4 of FIG. 7 represents the state of the toner memory 33 at the time of delivery of the toner cartridge 30. The type of the toner cartridge 30, the toner ID, and the continuously usable flag were stored in advance in the toner memory 33 when the toner cartridge 30 was manufactured.

The type of the toner cartridge 30 is an example of information indicating one of that the toner cartridge 30 is a contract cartridge and that the toner cartridge 30 is a normal cartridge. Here, the toner identification information is assumed to indicate the type of the toner cartridge 30. In a case where the toner cartridge 30 is unused, the toner memory 33 does not store the printer ID but stores information indicating that the toner cartridge 30 is unused. The continuously usable flag indicates that the toner cartridge 30 can be continuously used even after the service contract is cancelled.

The controller 80 transmits the toner memory information stored in the toner memory 33 read in S1 to the server 3. The timing at which the controller 80 transmits the toner memory information to the server 3 is not limited to the timing after the process of S1 which follows the turning on of the image forming apparatus 1. While the image forming apparatus 1 is on, the controller 80 may periodically transmit the toner memory information stored in the toner memory 33 to the server 3.

As illustrated in F1 of FIG. 6, control mode information of the controller 80, the printer ID, history information, usage mode information, and the number of unused toner cartridges 30 are stored in the main memory 13 as the main memory information.

The control mode information indicates one of that the controller 80 performs control in the contract state and that the controller 80 performs control in the normal state. The printer ID was stored in advance in the main memory 13 when the image forming apparatus 1 was manufactured.

The history information includes the toners ID stored in the toner memories 33 of toner cartridges 30 attached to the main casing 10. The controller 80 sequentially stores these toner IDs in the main memory 13 as a history.

The usage mode information indicates one of that the image forming apparatus 1 is in a first mode and that the image forming apparatus 1 is in a second mode. In the first mode, the image forming apparatus 1 can use an unused contract toner cartridge 30 and can use a contract toner cartridge 30 whose toner ID is stored in the history information. In the second mode, the image forming apparatus 1 cannot use an unused contract toner cartridge 30 but can use a contract toner cartridge 30 whose toner ID is stored in the history information.

The number of unused toner cartridges 30 represents the number of unused contract toner cartridges 30 that are delivered to the user but are not yet attached to the main casing 10.

The state of the main memory 13 illustrated in F1 of FIG. 6 represents a state that the image forming apparatus 1 is turned on in S1 and the image forming apparatus 1 is in the contract state. In other words, the image forming apparatus 1 is in a state that the toner cartridge 30 is attached to the main casing 10 in a case where the control mode information indicates the contract state. At the time of shipment of the image forming apparatus 1, the control mode information is set to the normal state in the main memory 13. Once the user concludes the service contract for the image forming apparatus 1, the control mode information is changed to the contract state".

In the present embodiment, in a case where the image forming apparatus 1 is in the contract state, the controller 80 can perform a rewrite process. In the rewrite process, the controller 80 rewrites the type of the toner cartridge 30 attached to the main casing 10 from the contract cartridge to the normal cartridge.

In S2 the controller 80 stores the type and toner ID of the toner cartridge 30 read from the toner memory 33 in a toner history region of the main memory 13. The toner history region is a storage region of the main memory 13 where the type and toner ID of the toner cartridge 30 are stored. After the type and toner ID of the toner cartridge read from the toner memory 33 are stored in the main memory 13, in S3 the controller 80 performs standby control.

In a case where in S4 the controller 80 determines that the cover 11 is open during the standby control, in S5 the controller 80 performs an error control. In a case where in S4 the controller 80 determines that the toner memory information cannot be read, the controller 80 may proceed to S5.

As the error control, for example, the controller 80 may display information on the display portion that the cover 11 is open. In a case where the cover 11 is moved from the open position to the close position, that is, a case where the cause of the error is resolved, the controller 80 returns to S1. In a case where the controller 80 determines that the cover 11 is closed, the controller 80 does not perform the error control of S5.

In a case where in S4 the controller 80 receives a print job from the PC 2 during the standby control and starts printing, in S6 the controller 80 performs a printing control. Since the printing control is not directly related to the nature of the present disclosure, the detailed description thereof is omitted.

After the printing control is performed by the controller 80, the controller 80 sequentially proceeds to the process of S3. In a case where the controller 80 does not receive a print job from the PC 2, the controller 80 does not perform the printing control of step S6.

In a case where in S4 the controller 80 receives a cancellation instruction to cancel the service contract from the server 3 during the standby control, in S7 the controller 80 starts a contract cancellation control. The controller 80 performs processes from S8 as the contract cancellation control.

With respect to step S7, in a case where the user connects the PC 2 to the server 3, and operates the PC 2 to transmit a cancellation instruction to the server 3, the server 3 transmits a cancellation instruction to the controller 80. At this time, the printer ID of the image forming apparatus 1 is stored in the server 3, and the controller 80 receives the cancellation instruction from the server 3 via the network interface 70.

According to the configuration of step S7, in a case where the user instructs the server 3 to cancel the service contract, the controller 80 receives the cancellation instruction to cancel the service contract from the server 3. Accordingly, this configuration allows the user to continuously use the toner cartridge 30.

In S4 and/or S7 the controller 80 may receive the cancellation instruction from the liquid-crystal display. The liquid-crystal display includes the touch panel and is provided on the outer surface of the main casing 10. In this case, the user operates the liquid-crystal display to transmit the cancellation instruction to the controller 80. The controller 80 may also receive a continuous use instruction and a stopping use instruction described later from the liquid-crystal display. The controller 80 may communicate with the liquid-crystal display instead of the server 3.

In a case where in S1 the controller 80 transmits to the server 3 information indicating that the toner cartridge 30 which is the normal cartridge is attached to the main casing 10 in the contract state, the server 3 may transmit the cancellation instruction to the controller 80.

As illustrated in S8 of FIG. 4, the controller 80 determines whether the type of the toner cartridge 30 attached to the main casing 10 is a contract cartridge or a normal cartridge. Specifically, the controller 80 recognizes the type of the toner cartridge 30 attached to the main casing 10 by referring to the toner memory information stored in the main memory 13. In this manner, the controller 80 can perform the process of S8.

By executing the process of S8, the controller 80 performs a determination process to determine whether the toner identification information stored in the toner memory 33 of the toner cartridge 30 attached to the main casing 10 indicates first information or second information. The first information indicates that the toner cartridge 30 is a contract cartridge. The second information indicates that the toner cartridge 30 is a normal cartridge.

Here, a case where in S8 the controller 80 determines that the type of the toner cartridge 30 attached to the main casing 10 is a contract cartridge will be considered. In this case, in S11 the controller 80 performs a rewrite process. In the rewrite process, as illustrated in F7 and F8 of FIG. 7, the controller 80 rewrites the type of the toner cartridge 30 from the contract cartridge to the normal cartridge. In other words, in a case where the toner identification information indicates that the toner cartridge 30 is a contract cartridge, the controller 80 performs the rewrite process to rewrite the toner identification information to information indicating that the toner cartridge 30 is a normal cartridge.

In this manner, the controller 80 rewrites the toner identification information from information indicating that the toner cartridge 30 is a contract cartridge to information indicating that the toner cartridge 30 is a normal cartridge. With this configuration, even after canceling the service contract, the user can continuously use the toner cartridge 30.

With this configuration, since the user does not have to discard the toner cartridge 30 having no quality problem after canceling the service contract, the image forming apparatus 1 is configured more environmentally friendly than a conventional image forming apparatus in which a toner cartridge cannot be used after cancellation of the service contract. The image forming apparatus 1 eliminates the need of returning the toner cartridge 30 to a manufacturer, and eliminates an environmental burden and cost of transporting and recycling the toner cartridge 30, and the user need not to return to a manufacturer the toner cartridge 30 although a conventional image forming apparatus requires the user to return to a manufacturer a toner cartridge that can no longer be used.

In a case where in S8 the controller 80 determines based on the toner identification information that the toner cartridge 30 is a contract cartridge in the determination process, in S11 the controller 80 performs the rewrite process. In this manner, since the controller 80 determines whether the toner cartridge 30 is a contract cartridge or a normal cartridge, the controller 80 can rewrite the toner identification information of the toner cartridge 30 in a case where the toner cartridge 30 is determined to be a contract cartridge.

Here, a case where in S8 the toner identification information, which is stored in the toner memory 33 of the toner cartridge 30 attached to the image forming apparatus 1, indicates that the toner cartridge 30 is a contract cartridge, will be considered. In this case, in response to reception of the cancellation instruction, the controller 80 can rewrite the toner identification information to information indicating that the toner cartridge 30 is a normal cartridge.

In S11, as illustrated in F1 and F2 of FIG. 6, the controller 80 rewrites the control mode information of the main memory information stored in the main memory 13 from the contract state to the normal state.

In S11, as illustrated in F4 and F5 of FIG. 7, the controller 80 may rewrite the continuously usable flag stored in the toner cartridge 30 attached to the main casing 10 from "FALSE" to "TRUE".

In a case where the controller 80 receives the continuous use instruction from the server 3, in S11 the controller 80 may perform the rewrite process. The continuous use instruction instructs the controller 80 to continuously use the toner cartridge 30. Accordingly, even after the service contract is canceled, the controller 80 can continuously use the toner cartridge 30 based on the instruction to continuously use the toner cartridge 30.

Specifically, as illustrated in F2 of FIG. 6 and F5 and F8 of FIG. 7, a case where the user connects the PC 2 to the server 3 and operates the PC 2 to select, on the server 3, the continuous use of the possessed cartridge will be considered. In this case, the server 3 transmits the continuous use instruction to the controller 80.

In a case where the controller 80 receives a stopping use instruction from the server 3, the controller 80 may not perform the rewrite process of S11. The stopping use instruction instructs to stop using the toner cartridge 30. Accordingly, after the service contract is canceled, the controller 80 can stop using the toner cartridge 30 based on the instruction to stop using the toner cartridge 30.

Specifically, as illustrated in F3 of FIG. 6 and F6 of FIG. 7, a case where the user connects the PC 2 to the server 3 and operates the PC 2 to select, on the server 3, an immediate stopping use of the toner cartridge 30 will be considered. In this case, the server 3 transmits the stopping use instruction to the controller 80. As illustrated in F3 of FIG. 6, in a case where the controller 80 receives the stopping use instruction, the controller 80 rewrites the usage mode information from information indicating the first mode to information indicating that the toner cartridge 30 is not continuously used. The controller 80 rewrites the number of unused toner cartridges 30 from "no limit" to 0.

On the other hand, in S8 the controller 80 determines that the type of the toner cartridge 30 attached to the main casing 10 is a normal cartridge, in S9 the controller 80 reads a toner ID of most recent toner memory information from the toner history region of the main memory 13. The toner ID of the most recent toner memory information is the toner ID which is, from among one or more toner IDs of one or more contract cartridges in the history information, stored in the history information in S2 immediately before the toner ID of the toner cartridge 30 determined to be a normal cartridge in S8.

In S10 the controller 80 stores the toner ID of the most recent toner memory information in a plan-to-rewrite-type list stored in the main memory 13. The plan-to-rewrite-type list stores the toner ID of any toner cartridge 30 whose type is the contract cartridge and is planned to be rewritten to the normal cartridge. The plan-to-rewrite-type list is used in S21 described later. After S10, the controller 80 proceeds to S12.

After the process of S11, in S12 the controller 80 sets the number of unused toner cartridges 30 in the main memory 13 based on an instruction received from the server 3. Specifically, the controller 80 receives information about the number of unused contract toner cartridges 30 from the server 3 via the network interface 70. The controller 80 stores the received information about the number of unused contract toner cartridges 30 in the main memory 13.

With respect to step S12, to calculate the number of unused toner cartridges 30, the server 3 subtracts the number of unused toner cartridges 30 attached to the main casing 10 from the number of contract toner cartridges 30 delivered to the user. Here, in S1 the server 3 receives from the controller 80 information indicating that an unused toner cartridge 30 is attached to the main casing 10 after the unused toner cartridge 30 is delivered to the user. With this configuration, the server 3 can manage the number of unused toner cartridges 30 attached to the main casing 10 after the delivery.

In S13 the controller 80 determines whether the number of unused toner cartridges 30 is one or more. Here, a case where the controller 80 determines that the number of unused toner cartridges 30 is one or more (YES in S13) will be considered. In this case, in S14 the controller 80 stores, in the main memory 13, information indicating that number of unused cartridges 30 whose type can be rewritten to the normal cartridge form the contract cartridge is up to a number N. Here, the number N is a natural number.

In other words, the controller 80 limits the number of rewrite processes performed on the toner memories 33 to a predetermined number. Limiting the number of rewrite processes can limit the number of toner cartridges 30 that can be continuously used. On the other hand, in a case where the controller 80 determines that the number of unused toner cartridges 30 is 0 (NO in S13), the controller 80 does not perform the process of S14.

A case after the process of S14 is completed or a case where the number of unused toner cartridges 30 is 0 (NO in step S13) will be considered. In this case, the controller 80 may perform processes from S15 triggered by turning on of the image forming apparatus 1 or moving of the cover 11 from the open position to the close position.

In S15 the controller 80 reads the main memory information from the main memory 13 and reads the toner memory information from the toner memory 33. After the controller 80 reads the main memory information and the toner memory information, in S16 the controller 80 determines whether the type of the toner cartridge 30 attached to the main casing 10 is a contract cartridge or a normal cartridge, as in S8.

In a case where the controller 80 determines that the type of the toner cartridge 30 attached to the main casing 10 is a normal cartridge, the controller 80 returns to S3. In a case where the controller 80 determines that the type of the toner cartridge 30 attached to the main casing 10 is a contract cartridge, in S17 the controller 80 determines whether the printer ID stored in the toner memory 33 indicates "unused" or the printer ID is already set.

In S17 the controller 80 may determine whether an unused cartridge flag stored in the toner memory 33 is "TRUE" or "FALSE". In a case where the controller 80 determines that the unused cartridge flag is "TRUE", the controller 80 proceeds to S22. In a case where the controller 80 determines that the unused cartridge flag is "FALSE", the controller 80 proceeds to S18. The unused cartridge flag indicates that the toner cartridge 30 is unused.

The controller 80 performs the process of S17 by referring to the printer ID stored in the toner memory 33. As shown in F4 of FIG. 7, in a case where the printer ID stored in the toner memory 33 indicates "unused", this printer ID is information stored in the toner memory 33 indicating that the toner cartridge 30 is unused.

In a case where in S17 the controller 80 determines that the printer ID stored in the toner memory 33 is already set, in S18 the controller 80 determines whether the printer ID stored in the main memory 13 matches the printer ID stored in the toner memory 33. In a case where no printer ID is stored in the toner memory 33, the process of S18 is omitted.

In a case where the controller 80 determines that the printer ID stored in the main memory 13 does not match the printer ID stored in the toner memory 33 (NO in S18), in S19 the controller 80 performs an error stop.

For example, as the error stop in S19, the controller 80 may control the display portion to display information indicating that an error occurs. Specifically, the controller 80 may control the liquid-crystal display to display a content indicating that the printer ID stored in the main memory 13 does not match the printer ID stored in the toner memory 33. After the process of S19, the controller 80 returns to S3.

In a case where the controller 80 determines that the printer ID stored in the main memory 13 matches the printer ID stored in the toner memory 33 (YES in S18), the controller 80 proceeds to S20. Performing the process of S18 produces the following effects.

Specifically, in a case where the toner cartridge 30 in which the printer ID is already set is attached to the main casing 10, the controller 80 can check whether this toner cartridge 30 is continuously usable in the image forming apparatus 1 for which the service contract was valid. This configuration can prevent a toner cartridge 30 intended to be continuously used in another image forming apparatus 1 from being used.

In S20 the controller 80 determines whether the continuously usable flag stored in the toner memory 33 is "TRUE" or "FALSE". In a case where the controller 80 determines that the continuously usable flag is "TRUE", the controller 80 returns to S3. In a case where the controller 80 determines that the continuously usable flag is "FALSE", in S21 the controller 80 performs an error stop similarly to S19.

In S21 the controller 80 may perform a process of permitting a continuous use of the toner cartridge 30 corresponding to the toner ID stored in the plan-to-rewrite-type list. Specifically, the controller 80 determines whether the toner ID of the toner memory information read in S15 is stored in the plan-to-rewrite-type list. In a case where the controller 80 determines that the toner ID of the toner memory information read in S15 is stored in the plan-to-rewrite-type list, the controller 80 returns to S3.

A case where in S17 the controller 80 determines that the printer ID stored in the toner memory 33 indicates "unused" will be considered. In this case, in S22 the controller 80 determines whether the usage mode information indicates the first mode or the second mode. In a case where the controller 80 determines that the usage mode information indicates the second mode, in S23 the controller 80 performs an error stop similarly to S19. After the process of S23, the controller 80 returns to S3.

In a case where the controller 80 determines that the usage mode information indicates the first mode (FIRST MODE in S22), in S24 the controller 80 stores the printer ID in the toner memory 33 as illustrated in F5 of FIG. 7. In addition, in S25, the controller 80 rewrites the main memory information stored in the main memory 13.

The process of S25 will be described in detail below. A case where an unused contract toner cartridge 30 delivered to the user is attached to the main casing 10 prior to S1, and the number of unused toner cartridges 30 is decreased from 1 to 0 will be considered. In this case, as illustrated in F2 of FIG. 6, the controller 80 rewrites the usage mode information of the main memory information stored in the main memory 13 from the first mode to the second mode. Here, in S24, the controller 80 may rewrite the unused cartridge flag from "TRUE" to "FALSE".

Fixed-Price Printing Control

The controller 80 performs a fixed-price printing control as the printing control of S6. The fixed-price printing control is a control in the contract state in which a predetermined number of sheets can be printed at a fixed price for each set period of time. A case where the user concludes the service contract for the image forming apparatus 1 at a fixed price by connecting the PC 2 to the server 3 will be considered.

In this case, a manufacturer managing the server 3 delivers one unused toner cartridge 30 to the user using the image forming apparatus 1. The toner identification information stored in the toner memory 33 of this unused toner cartridge 30 indicates that the toner cartridge 30 is a contract cartridge.

After performing the printing control of S6, the controller 80 transmits the toner life information of the toner cartridge 30 to the server 3. Alternatively, the controller 80 may periodically transmit the toner life information to the server 3, regardless of whether the printing control is performed.

A case where the server 3 refers to the toner life information received from the controller 80 and determines that the lifetime of the toner cartridge 30 attached to the main casing 1 becomes shorter than or equal to a prescribed period of time will be considered. In this case, in a case where the lifetime of the toner cartridge 30 is within a period of time during which the toner cartridge 30 can be used, the manufacturer delivers an unused toner cartridge 30 to the user.

Every time the lifetime of the toner cartridge 30 becomes shorter than or equal to the prescribed period of time, an unused toner cartridge 30 is delivered to the user. By using the toner cartridge 30 delivered by the manufacturer, the image forming apparatus 1 can print up to 200 sheets per month under printing control, for example. In a case where the number of sheets printed exceeds 200, the user can print additional sheets by paying an additional charge in addition to the fixed price.

Determination of Amount of Payment for Toner Cartridge

In a case where during the process of S12 performed by the controller 80 the server 3 determines that the number of unused toner cartridges 30 is one or more, the server 3 displays a content presenting three options on the PC 2. The first option is to allow the user to return both an unused toner cartridge(s) 30 and a toner cartridge(s) 30 in use to the manufacturer.

The second option is to allow the user to purchase only the toner cartridge(s) 30 in use and return the unused toner cartridge(s) 30 to the manufacturer. The third option is to allow the user to purchase both the unused toner cartridge(s) 30 and the toner cartridge(s) 30 in use.

In a case where during the process of S12 performed by the controller 80 the server 3 determines that the number of unused toner cartridges 30 is 0, the server 3 displays a content presenting two options on the PC 2. The first option is to allow the user to return the toner cartridge(s) 30 in use to the manufacturer. The second option is to allow the user to purchase the toner cartridge(s) 30 in use.

In a case where the user selects one of the two or three options by operating the PC 2, the server 3 displays on the PC 2 the amount the user needs to pay for the toner cartridge(s) 30. The server 3 determines the amount the user needs to pay for the toner cartridge(s) 30 according to the quantity of toner remaining in the toner cartridge(s) 30 to be purchased by the user. With this configuration, the manufacturer can receive a fair share of the toner cartridge(s) 30 while the user can avoid overpayment.

Supplementary Information

In the image forming apparatus 1 described above is a printer of the electrophotographic method. However, the image forming apparatus 1 may be a printer of an inkjet method. In a case of the printer of the inkjet method, ink cartridges supplying ink may be cartridges. In this case, the contents of the present disclosure are applied to the ink cartridge. Alternatively, tape cassettes (or tape cartridges) supplying tapes as printing material may be cartridges. In this case, the contents of the present disclosure are applied to the tape cassettes (or the tape cartridges). The image forming apparatus 1 may not be limited to the above-described configurations in which the drum cartridge 20 includes the photosensitive drum 22 and the toner cartridge 30 includes the developing roller 32.

First Modification

In a first modification, each drum cartridge 20 may include the developing roller 32 in addition to the cartridge casing 21, the photosensitive drum 22, and the drum memory 23. In this case, the cartridge casing 21 includes the photosensitive drum 22, the drum memory 23, and the developing roller 32. In the first embodiment, each toner cartridge 30 includes the cartridge casing 31 and the toner memory 33, but does not include the developing roller 32. The cartridge casings 31 accommodate toner. The outer circumferential surface of each developing roller 32 contacts the outer circumferential surface of the corresponding photosensitive drums 22 inside the drum cartridge 20.

Second Modification

In a second modification, the image forming apparatus 1 may further include developing cartridges, not illustrated. Each developing cartridge includes the developing roller 32. In this case, each drum cartridge 20 includes the cartridge casing 21, the photosensitive drum 22, and the drum memory 23. Each toner cartridge 30 includes the cartridge casing 31 and the toner memory 33 but does not include the developing roller 32. The cartridge casings 31 accommodate toner. In a case where the drum cartridge 20, the toner cartridge 30, and the developing cartridge are attached to the main casing 10, these three components are together held in the corresponding cartridge holder 12.

Third Modification

In a third modification, the image forming apparatus 1 may include cartridges (not shown) instead of including the drum cartridges 20 and toner cartridges 30. In this case, each cartridge includes a cartridge casing, the photosensitive drum 22, a memory, and the developing roller 32. The outer circumferential surface of the developing roller 32 contacts the outer circumferential surface of the photosensitive drum 22 inside the cartridge. The cartridge casing of each cartridge accommodates toner.

Fourth Modification

In a fourth modification, the present disclosure may be applied so that each drum cartridge 20 or the transfer belt 40 is considered as a cartridge instead of the toner cartridge 30.

While the present disclosure is not limited to the embodiments described above, and it would be apparent to those skilled in the art that various changes and modifications may be made therein without departing from the scope of claims. The configurations made by suitably combining the technical means disclosed in the embodiments are included in the scope of the present disclosure.

What is claimed is:

1. A method comprising:

when a service contract associated with an image forming apparatus is cancelled, displaying, by a personal computer, an image showing an option to purchase a contract cartridge according to a cancellation of the service contract for the image forming apparatus, the contract cartridge being used in the image forming apparatus in a state where the image forming apparatus is in a contract state, and the contract cartridge being configured to be not usable in the image forming apparatus in a state where the image forming apparatus is in a normal state;

selecting the option to purchase the contract cartridge in a state where the image forming apparatus is in the contract state; and transmitting, from the personal computer, an instruction indicating to purchase the contract cartridge.

2. The method of claim 1, wherein the instruction indicates to allow use of the contract cartridge in a state where the image forming apparatus is in the normal state.

3. The method of claim 1, wherein the personal computer transmits a continuous use instruction to a server that is communicatively connected to the image forming apparatus.

4. The method of claim 1, wherein the instruction comprises an instruction to modify a setting of the contract cartridge.

5. A computer-readable storage medium comprising computer-executable instructions which, when executed on a personal computer having a processor and a memory, cause the personal computer to perform:

when a service contract associated with an image forming apparatus is cancelled, displaying an image showing an option to purchase a contract cartridge according to a cancellation of the service contract for the image forming apparatus, the contract cartridge being used in the image forming apparatus in a state where the image forming apparatus is in a contract state, and the contract cartridge being configured to be not usable in the image forming apparatus in a state where the image forming apparatus is in a normal state;

selecting the option to purchase the contract cartridge in a state where the image forming apparatus is in the contract state; and transmitting an instruction indicating to select the option to purchase the contract cartridge.

6. The computer-readable storage medium of claim 5, wherein the instruction indicates to allow use of the contract cartridge in a state where the image forming apparatus is in the normal state.

7. The computer-readable storage medium of claim 5, wherein the personal computer transmits a continuous use instruction to a server that is communicatively connected to the image forming apparatus.

8. The computer-readable storage medium of claim 5, wherein the instruction comprises an instruction to modify a setting of the contract cartridge.

* * * * *